United States Patent
Hafermalz

(12) 
(10) Patent No.: US 6,193,008 B1
(45) Date of Patent: Feb. 27, 2001

(54) RACK-AND-PINION ASSISTED STEERING SYSTEM

(75) Inventor: Jens-Uwe Hafermalz, Schwäbisch Gmünd (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/308,329

(22) PCT Filed: Nov. 13, 1997

(86) PCT No.: PCT/EP97/06334

§ 371 Date: May 19, 1999

§ 102(e) Date: May 19, 1999

(87) PCT Pub. No.: WO98/22326

PCT Pub. Date: May 28, 1998

(30) Foreign Application Priority Data

Nov. 19, 1996 (DE) .............................................. 196 47 797

(51) Int. Cl.⁷ ...................................................... B62D 5/06
(52) U.S. Cl. .............................................. 180/428; 74/422
(58) Field of Search ...................................... 180/427, 428, 180/400; 74/422, 493, 498; 280/93.514, 93.515; 73/118.1

(56) References Cited

U.S. PATENT DOCUMENTS

| | | |
|---|---|---|
| 3,347,109 | 10/1967 | Adams et al. . |
| 3,777,589 | 12/1973 | Adams . |
| 3,831,697 * | 8/1974 | Wahlmark ........................ 180/79.2 R |
| 3,871,469 * | 3/1975 | Millard et al. .................. 180/79.2 R |
| 4,008,627 | 2/1977 | Bradshaw et al. . |
| 4,307,622 | 12/1981 | Walter . |
| 4,539,857 * | 9/1985 | Kako et al. ............................. 74/422 |
| 4,651,842 | 3/1987 | Rosell . |
| 4,691,583 * | 9/1987 | Taig ....................................... 74/422 |
| 4,788,878 * | 12/1988 | Morita et al. ........................... 74/422 |
| 4,827,788 | 5/1989 | Beer et al. . |
| 4,865,149 * | 9/1989 | Rohrbach et al. .................... 180/148 |
| 4,979,405 * | 12/1990 | Hagele et al. .......................... 74/422 |
| 5,429,202 * | 7/1995 | Millard et al. .......................... 180/79 |
| 5,509,493 * | 4/1996 | Lang et al. ............................ 180/132 |
| 5,544,522 * | 8/1996 | Little .................................. 73/118.1 |
| 5,590,566 * | 1/1997 | Joerg et al. ............................. 74/498 |
| 5,622,085 * | 4/1997 | Kostrzewa ............................. 74/498 |
| 5,682,959 * | 11/1997 | Joerg et al. .......................... 180/428 |
| 5,730,244 | 3/1998 | Engler et al. . |

FOREIGN PATENT DOCUMENTS

| | | |
|---|---|---|
| 35 35 552 | 4/1986 | (DE) . |
| 195 45 439 A1 * | 6/1997 | (DE) . |
| 2 249 067 | 4/1992 | (GB) . |

* cited by examiner

Primary Examiner—Brian L. Johnson
Assistant Examiner—Daniel Yeagley
(74) Attorney, Agent, or Firm—Larson & Taylor PLC

(57) ABSTRACT

In a rack-and-pinion assisted steering system with an elastic connection housing, for example made of plastic arranged between the pinion housing (6) and the cylinder housing, the bearing points of the rack (1) and pinion (2) are not fixed in a housing. The alignment of the pinion axis (A) with the pinion housing is effected via the existing contact line (B) between the rack teeth and the pinion teeth. The rack teeth are pressed without play between the pinion teeth by means of an additional pressure member (7) in the lid (5) of the pressure piece (3) thereby aligning the pinion axis (A) with the pinion housing (6). After the rack-and-pinion assisted steering system is mounted in the vehicle, the pressure member (7) is removed and the effect of the spring-mounted pressure piece (3) is reestablished. The aligned pinion axis (A) ensures a good rolling between pinion and rack teeth.

9 Claims, 2 Drawing Sheets

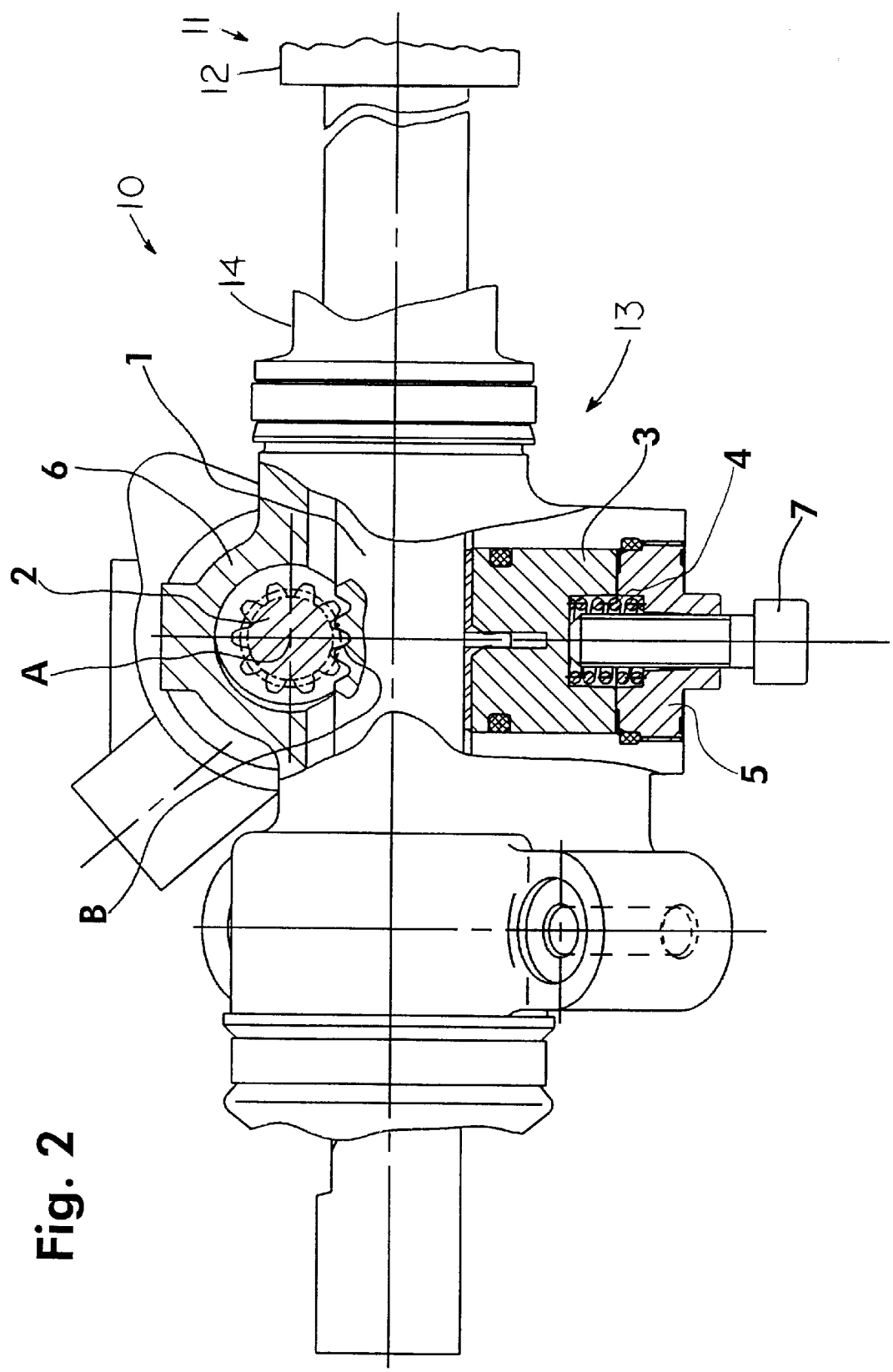

RACK-AND-PINION ASSISTED STEERING SYSTEM

FIELD OF THE INVENTION

The invention relates to a rack-and-pinion assisted steering system, in particular for motor vehicles, having a multiple-part steering housing, which has a pinion housing and a cylinder housing, with a highly elastic connection housing disposed between the two housing parts. A pinion rotates in the pinion housing. A rack axially displaceably guided in the multiple-part steering housing is held in engagement with the pinion in the pinion housing by a spring-loaded pressure piece. The rack is connected via a piston rod to a piston, which divides two pressure chambers of a servo motor from one another in the cylinder housing. The connection housing is embodied such that no position-determining forces are transmitted from the pinion housing to the cylinder housing.

BACKGROUND OF THE INVENTION

The invention takes as its point of departure German Patent Disclosure DE 195 45 439, which was not published prior to the filing date of the present application, and which describes a rack-and-pinion assisted steering system in which overdetermination of the bearing of the rack in the steering housing is avoided without complicated tightening of the tolerances in the manufacture of the steering housing and the rack. The production is simplified by providing that the connection housing between the pinion housing and the cylinder housing is of an elastic material. By means of the elastic connection housing, which itself does not transmit any forces or moments, an overdetermination of the bearing of the rack in the steering housing can be avoided. The location of the pinion housing relative to the cylinder housing is defined by the rack.

In rack-and-pinion assisted steering systems with a relatively rigid connection between the pinion housing and the cylinder housing, production errors between the pinion axis and the rack axis worsens the rolling performance. On the one hand, the teeth of the pinion and rack determine the axes and on the other, the bearing points of the rack and the pinion determine two further axes. So that these axes will match, the components in question must be machined very precisely. The dimensional tolerances and the shape and position tolerances are correspondingly narrow, which means high production costs. In the design in DE 195 45 439, the bearing points of the rack and the pinion are not rigidly fixed in a housing. The alignment of the pinion axis A is effected via the existing contact line B of the teeth. The rack teeth are pressed by the pressure piece into the pinion teeth, thereby aligning the pinion axis. Because of the existing pressure piece play, however, the pinion axis can still shift slightly relative to the rack teeth. This again leads to poor rolling performance of the teeth.

BRIEF SUMMARY OF THE INVENTION

The object of the invention, in rack-and-pinion assisted steering systems with an elastic connection housing, is to avoid the source of error that is still present because of the pressure piece play, so that optimal rolling performance of the teeth is obtained.

This object is attained by the rack-and-pinion assisted steering system as discussed here after. This is accomplished in that an additional pressure member acts on the spring-loaded pressure piece and, in the state of the rack-and-pinion assisted steering system in which it is not yet installed on the vehicle, presses the rack without play into the pinion and after installation of the steering in the vehicle is removed. As a result, the pinion axis can be aligned with the pinion housing via the existing teeth. The pressure member thus eliminates the pressure piece play by pressing the pressure piece against the rack and the rack against the pinion. This cancels the action of the pressure piece. In this way, the alignment of the pinion axis with the line of contact of the rack teeth and the pinion teeth is assured without play between these components.

An expedient embodiment is where the pressure member is supported in a lid of the pressure piece and is embodied as a screw. In this way, an economical way of achieving an additional pressure member acting on the rack is achieved.

In accordance with the expediant embodiment, the pressure member secures the rack in the middle position, so that the vehicle is in position for driving straight ahead. This position is preferred by automobile manufacturers for installing the steering system.

BRIEF DESCRIPTION OF THE DRAWINGS

The invention will be described in further detail below in terms of an exemplary embodiment shown in the drawing.

Shown are.

DESCRIPTION OF PREFERRED EMBODIMENT

Figure 1:
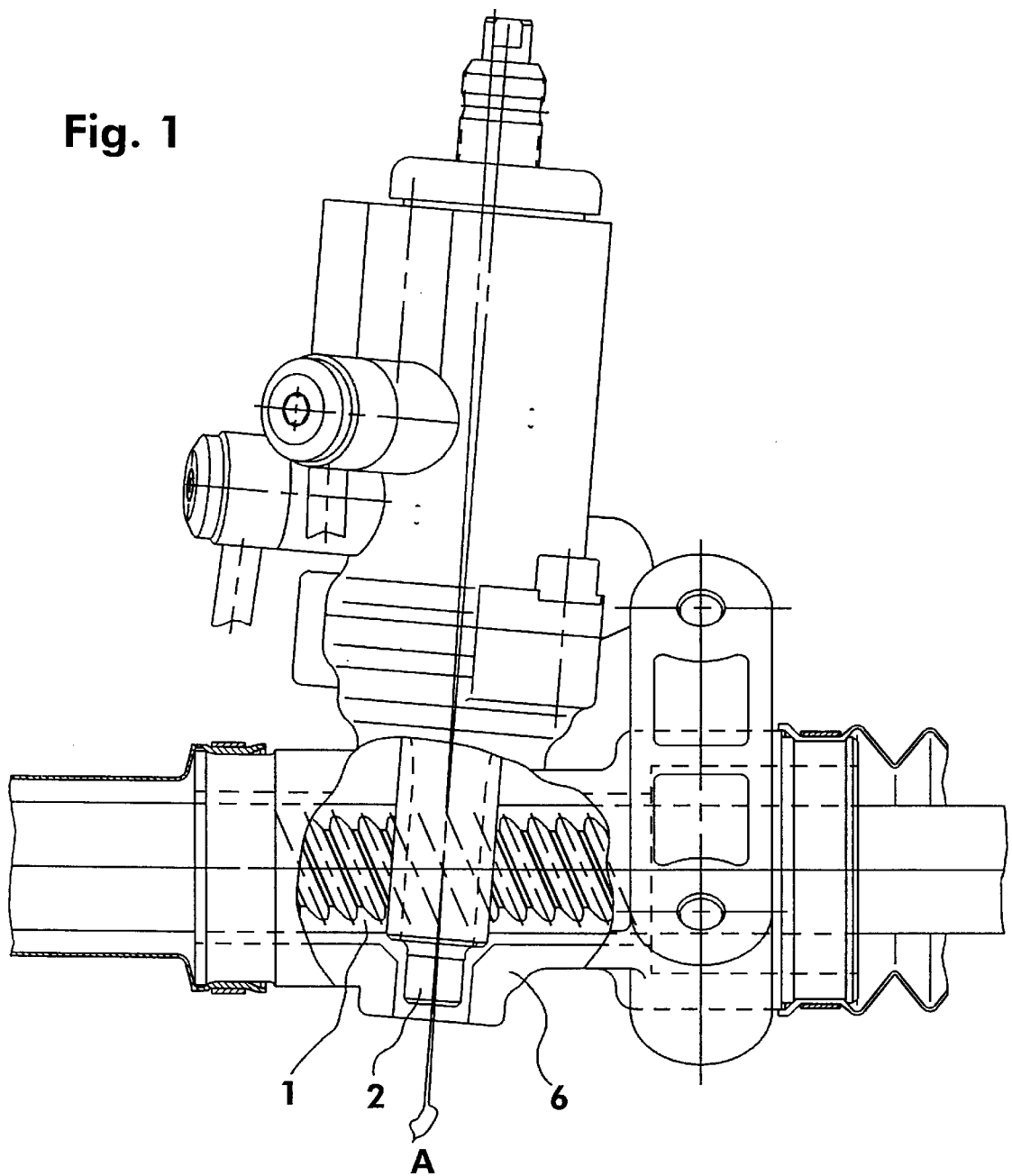
FIG. 1, a plan view on the steering gear with the pinion housing partly cut away, and FIG. 2, another plan view on the steering gear, with the pinion housing partially cut away and showing the pressure piece and the pressure member.

As shown schematically in FIG. 2, the present invention is a rack-and-pinion assisted steering system 10 including a servo motor 11 having a cylinder housing 12. System 10 also includes a multi-part steering housing 13 having a pinion housing 6 and a highly elastic connection housing 14. Connection housing 14 is disposed between pinion housing 6 and cylinder housing 12.

As FIGS. 1 and 2 show, a rack 1 meshes with a pinion 2. The alignment of the pinion axis A is effected via the existing contact line B (FIG. 2). A pressure piece 3 presses the rack teeth into the pinion teeth by the force of a spring 4 and aligns the pinion axis A. The spring 4 is braced in a lid 5 in a pinion housing 6. The pinion axis A can still shift slightly, however, relative to the rack teeth within the existing pressure piece 3 play. According to the invention, a pressure member 7 is seated in the lid 5 and pushes the pressure piece 3 against the rack 1 and the rack against the pinion 2. This pressure member screw 7, in contrast to the pressure piece 3, defines play-free support of the rack 1 in the pinion 2. In this state, the pinion housing 6 is then installed in the vehicle, and after that the pressure member 7 is removed again. The pressure piece 3 play established beforehand is now again present. A screw can for instance be used as the pressure member 7.

By means of the invention, a similar advantage as in selective installation can be attained. In selective installation, the housing bearing points are surveyed exactly and consequently paired with selected sets of teeth on the pinion and the rack. However, such a selection is not feasible, because of the costs and the high numbers of parts involved. When an elastic connection housing 14 is used in conjunction with the pressure member 7 of the invention, optimal pairing of the components is automatically obtained by the alignment of the pinion axis A with the teeth of the rack 1.

Other advantages are obtained in that production errors in the manufacture of the pinion and rack teeth can be greater yet without worsening the rolling performance. Because of the higher production tolerances, the rejection rate drops, and manufacturing processes with a higher machining speed can be employed. This leads to a cost reduction for better or equal rolling quality of the teeth.

It is provided that the pressure member fixes the rack, in the state as shipped, in the middle position with the pressure piece in the pinion; that is, in this position, the vehicle drives straight ahead. This shipping state is preferred by many automobile manufacturers, because the installation in the vehicle can be simplified thereby.

What is claimed is:

1. A rack-and-pinion assisted steering system which is provided in a shippable form for subsequent installation, said steering system comprising:

a servo motor including a cylinder housing;

a multiple-part steering housing including a pinion housing and a highly elastic connection housing disposed between said pinion housing and the cylinder housing of the servo motor;

a pinion rotatably supported in said pinion housing;

a rack axially displaceably guided in said steering housing;

a spring-loaded pressure piece provided in said pinion housing which urges said rack into engagement with said pinion, said pressure piece allowing some desirable play between said rack and said pinion during use; and a pressure member which releasably presses said pressure piece into positive engagement with said rack which is in turn pressed into positive engagement with said pinion to temporarily eliminate the desirable play between said rack and said pinion otherwise allowed by said pressure piece, whereby after shipping and installation said pressure member is released to eliminate the positive engagement of said pressure piece with said pinion and to allow the desirable play during use.

2. The rack-and-pinion assisted steering system as claimed in claim 1:

further including a lid in said pinion housing adjacent said pressure piece and a spring trapped between said lid and said pressure piece which together produce a spring pressure against said pressure piece; and wherein said pressure member is a screw adjustably threaded through said lid so that an end of said screw positively engages said pressure piece.

3. The rack-and-pinion assisted steering system as claimed in claim 2, wherein said spring is a coil spring which is located about said screw.

4. The rack-and-pinion assisted steering system as claimed in claim 1, wherein said pressure member fixes said rack in a straight ahead driving position thereof.

5. A multi-part steering housing which is used in a rack-and-pinion assisted steering system provided in a shippable form for subsequent installation, said multi-part steering housing comprising:

a pinion housing;

a connection housing connected to said pinion housing on a cylinder housing side thereof;

a pinion rotatably supported in said pinion housing;

a rack axially displaceably guided in said pinion housing and said connection housing;

a spring-loaded pressure piece provided in said pinion housing which urges said rack into engagement with said pinion, said pressure piece allowing some desirable play between said rack and said pinion during use; and a pressure member which releasably presses said pressure piece into positive engagement with said rack which is in turn pressed into positive engagement with said pinion to temporarily eliminate the desirable play between said rack and said pinion otherwise allowed by said pressure piece, whereby after shipping and installation said pressure member is released to eliminate the positive engagement of said pressure piece with said pinion and to allow the desirable play during use.

6. The multi-part steering housing as claimed in claim 5:

further including a lid in said pinion housing adjacent said pressure piece and a spring trapped between said lid and said pressure piece which together produce a spring pressure against said pressure piece; and wherein said pressure member is a screw adjustably threaded through said lid so that an end of said screw positively engages said pressure piece.

7. The multi-part steering housing as claimed in claim 6, wherein said spring is a coil spring which is located about said screw.

8. The multi-part steering housing as claimed in claim 5, wherein said pressure member fixes said rack in a straight ahead driving position thereof.

9. The multi-part steering housing as claimed in claim 5, wherein said connection housing is elastic.

* * * * *